Oct. 16, 1962

R. D. LEWIS 3,058,608

BOAT TRAILER

Original Filed Dec. 27, 1957

Raymond D. Lewis
INVENTOR.

BY
Attorneys

Oct. 16, 1962
R. D. LEWIS
3,058,608
BOAT TRAILER
Original Filed Dec. 27, 1957
2 Sheets-Sheet 2
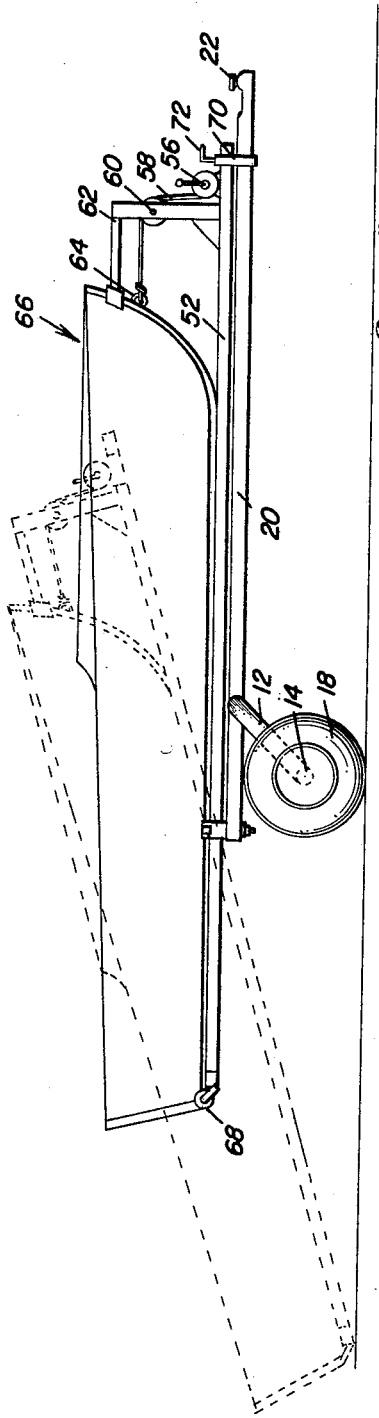
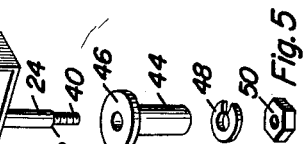
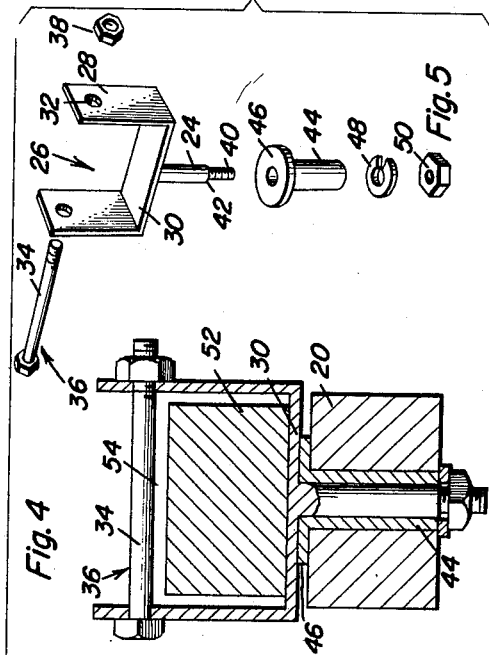
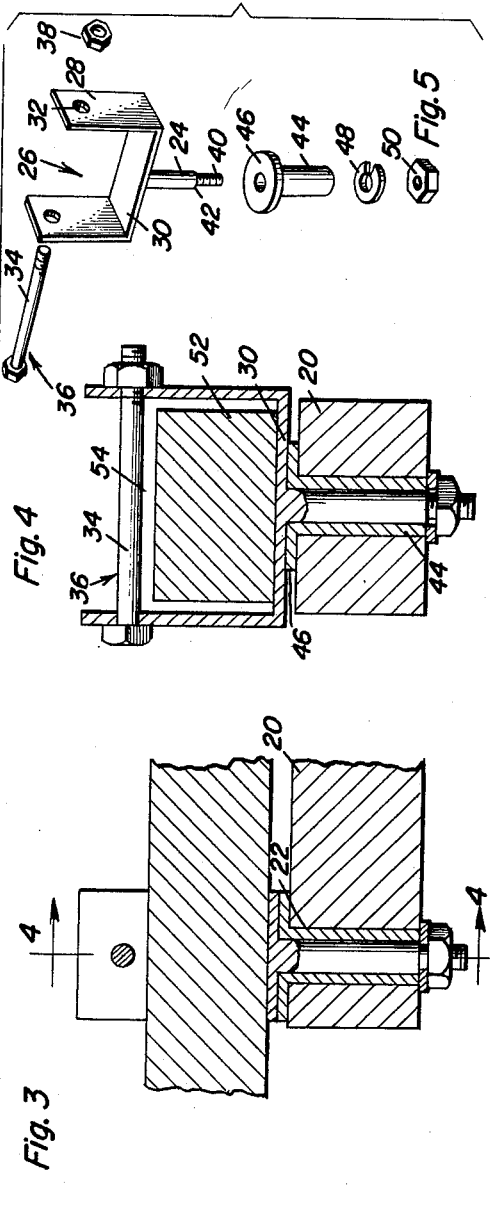
Raymond D. Lewis
INVENTOR.
BY
Attorneys

3,058,608
BOAT TRAILER
Raymond D. Lewis, 2624 34th Ave. N., Texas City, Tex.
Continuation of application Ser. No. 705,623, Dec. 27, 1957. This application July 9, 1959, Ser. No. 826,097
12 Claims. (Cl. 214—505)

This is a continuation of U.S. Serial No. 705,623 filed December 27, 1957, now abandoned.

This invention relates generally to boat trailers and more particularly to new and useful improvements in boat trailers relating to the loading and unloading of a boat onto or from the trailer.

It is the principal object of this invention to provide a new construction in boat trailers to facilitate loading.

It is a further object of this invention to provide a boat trailer including a pivotal bed which allows a man to pivot the bed and so follow a possible drift of the boat in the water due to a wind.

It is a still further object of this invention to provide a tilting movement of the trailer bed relative to the base for further facilitating the loading of a boat.

It is also an object of this invention to include specially constructed winch means to further facilitate loading and detachable locking means between the bed and base to assure proper operation of the trailers carrying function.

It is a still further object of this invention to provide a novel boat trailer construction which is relatively simple, reliable, and inexpensive to manufacture.

In accordance with the above stated objects, below is described a novel construction for boat trailers including a base having rotatable depending wheels and a bed slidably and pivotally mounted on said base. The invention further contemplates the inclusion of winch means for facilitating the loading of a boat upon the bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the trailer of this invention in its operative position adapted to be pulled by a self-propelled vehicle. The figure further shows in phantom lines the tilted relationship between the bed and base;

FIGURE 3 is a sectional view on the slidable, pivotal and tiltable connection between the bed and base taken substantially along the plane 3—3 of FIGURE 1;

FIGURE 4 is a further sectional view of the connection between the bed and the base taken substantially along the plane 4—4 of FIGURE 3; and FIGURE 5 is a disassembled view of the elements of the connection between the bed and the base.

Figure 1:
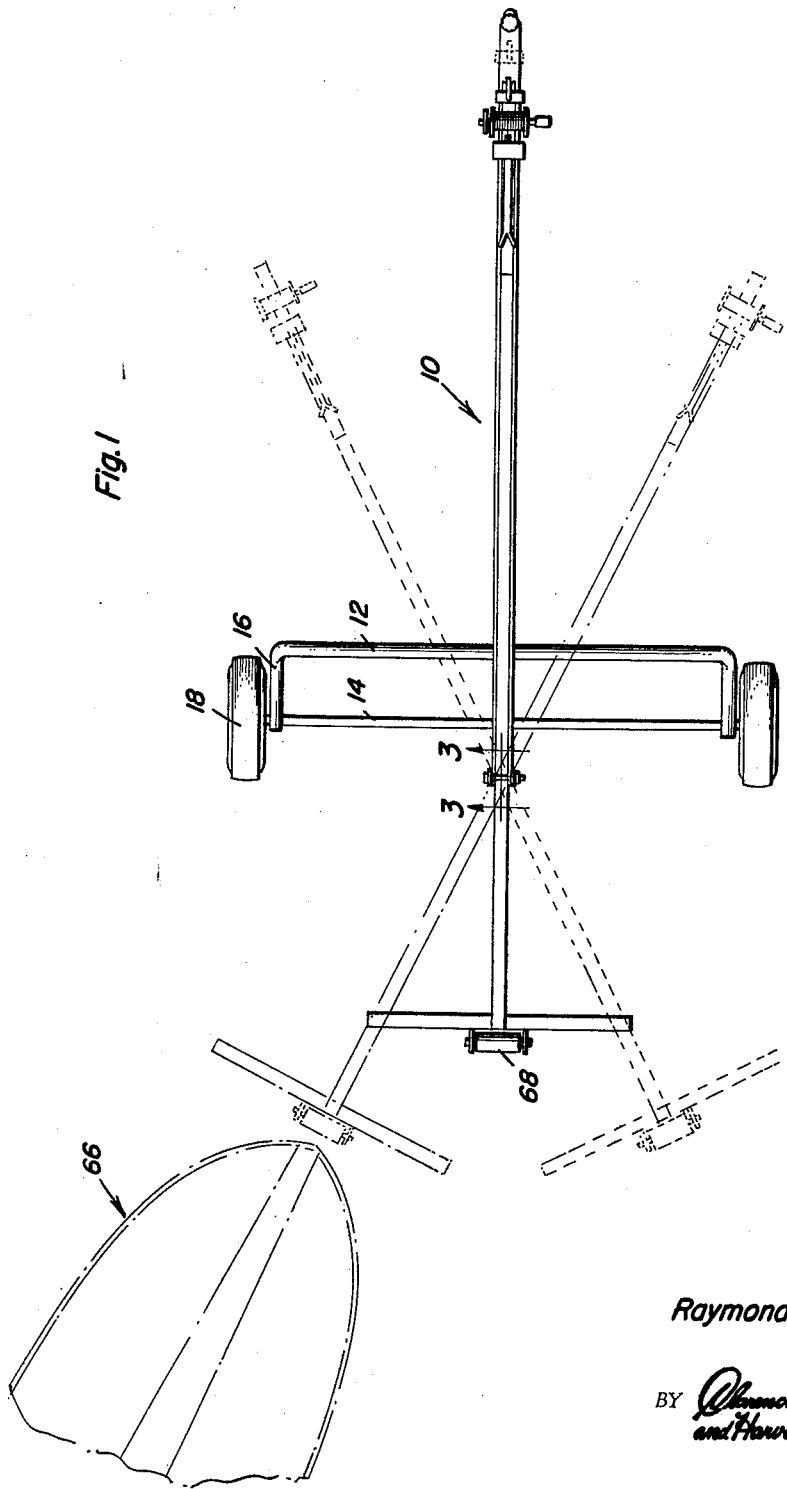
FIGURE 1 shows a top elevational view of the trailer in this invention showing in phantom lines the pivotal connection of the bed.

With continuing reference to the drawings, numeral 10 generally designates the trailer comprising this invention including a supporting frame 12 in the form of a U-shaped member having a shaft 14 supported between its leg portions 16. The shaft 14 rotatably supports a pair of wheels 18 at the terminal ends thereof. The supporting frame 12 supports an elongated base member 20. The base 20 has a connection 22 which is adapted to be hooked up to a self-propelled vehicle (not shown) for pulling the base, thereby imparting rolling movement to the wheels 18.

At a second end of the base 20 is a cylindrical aperture 23 which proceeds through the base a depth equal to the base 20. Supported within this aperture 23 is a shank portion 24 of a fork member 26 having a bifurcated portion 28 and a bight portion 30. The bifurcated portion 28 has aligned apertures 32 therein which are adapted to receive the shank portion 34 of a bolt 36. The bolt 36 fits through aligned apertures 32 in the bifurcated portion 28 of fork member 26 and is threadedly engaged with the nut 38 so as to be maintained in fixed relationship to the fork member 26. Depending from the shank portion 24 of fork member 26 is a narrow threaded portion 40. Distinct shoulder 42 exists between the shank portion 24 and threaded portion 40. A sleeve 44 having a flange 46 on the top thereof is adapted to be rotatably inserted around shank 24 of fork member 26. The inner diameter of sleeve 44 must be slightly larger than the outer diameter of the shank 24. A washer 48 has an inner diameter slightly larger than the threaded portion 40 depending from shank 24. The washer 48 is intended to abut the shoulder 42, defining the line between shank 24 and threaded portion 40, when nut 50 is threadedly engaged on threaded portion 40.

A bed portion 52 is slidably inserted on bight 30 of fork member 26 between the bight 30 and bolt 36. The sleeve 44 rotatably sets in aperture 23 of base 20 with the flange 46 abutting the base 20. The bed 52 is shown in FIGURE 4 simply as an elongated member having rectangular cross-section. However, the bed 52 may have a channel shaped upper portion for more easily accommodating the keel of a boat or an additional channel shaped member may be bolted to but spaced from the bed 52 allowing the bolt 36 to be inserted therebetween. Regardless of the specific structure utilized, the bed 52 must be slidably retained between the shank 34 of bolt 36 and the bight 30 of fork member 26. FIGURE 4 clearly shows that the bolt 36 is spaced from the bed 52 as at 54. This spacing is intentional in that it allows the bed 54 to be tilted into the position shown by the phantom lines in FIGURE 2.

A winch 56 has a cable 58 which extends over an idle pulley 60 rotatably mounted on stop arm 62. The cable 58 is adapted to be hooked to an eye 64 of a boat 66 intended to be loaded and carried on trailer 10. The winch 56 is carried by the bed 52 and in combination with the idle pulley 60 provides that the cable 58 will extend substantially parallel to the desired path of motion of the boat 66. A roller 68 is supported by the bed 52 at its rear end thereof and is adapted to guide and facilitate the longitudinal movement of the boat upon the bed 52.

A collar 70 fits around base 20 and is of a large enough size to include a terminal portion of bed 52. The collar 70 includes a screw crank 72 which communicates with the inner portions of collar 70. The function of the collar 70 is to lock the bed 52 relative to the base 20 this is done by fitting the collar 70 around the base 20 and bed 52 and screwing the screw crank 72 so that it bears against the bed 52 compressing the bed and base together. Of course, apertures could be provided in the base 52 to accommodate the screw crank 72. It should be apparent that the screw crank 72 and collar 70 are utilized only when this invention is performing its carrying function. Of course, during the loading performance screw crank 72 would be unscrewed so that the collar 70 could be moved forward releasing its bearing pressure on bed 52.

In the operation of this device, it is desired that the boat 66 be lifted from the water onto the bed 52 of trailer 10. As is shown in FIGURE 1, the bed 52 is pivoted about the shank 24 and collar 44 to a position approximately parallel to the keel of the boat. As may be seen in FIGURE 1, regardless of the position the boat 66 has assumed after the trailer 10 has been parked, the bed 52 is adaptable to conform to the drift created by the wind. When the bed 52 is approximately parallel to the keel of the boat 66, the cable 58 is affixed to the eye 64 of the boat 66. The operator of the trailer will then proceed to turn the crank of the winch 56, thereby pulling the cable 58 and boat 66 over the roller 68 and along the bed 52. The boat is further pulled over the bolt 36 until it assumes the tilted position shown in phantom lines in FIGURE 2. The winch is locked in this position so that the boat is firmly held against the stop post 62. The bed 52 is then raised at its rear end and slid between the bight 30 of fork member 26 and the shank 34 of bolt 36. It will then assume the position shown in the solid lines in FIGURE 2. In this position, the operator will lock the collar 70 about the bed 52 and base 20 to maintain the relationship shown in solid lines in FIGURE 2. Hence, the trailer is then properly positioned to be pulled by a self-propelled vehicle. It is to be noted that the slidable movement of the bed allows it to be secured in slightly different positions relative to the base. This feature is advantageous inasmuch as it allows the bed to be more properly balanced on the base depending on whether the boat is weighted at the rear with one or two outboard motors. The boat is intended to rest on the bed 52 and the bolt 36. It is stressed that the bed 52 may be channel shaped at its upper portion to act as a car for the keel of the boat 66. It is further noted that a channel member could be bolted to the bed 52 at a distance therefrom to provide for the insertion of the bolt 36 therebetween.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat trailer comprising a base, a forked member, said member including a bifurcated portion and a shank portion, said shank portion rotatably supported by said base, a bed slidably supported in said bifurcated portion, said bed including winch means carried thereby, and rotatable ground wheel means dependingly supported from said base, and retaining means detachably locking said bed to said base.

2. The combination of claim 1 including a roller mounted on a terminal portion of said bed.

3. A boat trailer comprising a base, a forked member, said member including a bifurcated portion having a bolt therethrough and a shank portion, said shank portion rotatably supported by said base, a bed slidably supported in said bifurcated portion beneath said bolt, winch means carried by said bed, a collar detachably locking said bed to said base, a roller mounted on a terminal portion of said bed, and a pair of wheels depending from said base.

4. A boat trailer comprising a base, ground wheel means dependingly supported for rotation from said base, a fork member, said fork member including a vertical bifurcated portion, a vertical shank portion, mounting means for rotatably mounting said shank portion in said base, a bed, said bed slidably supported within said bifurcated portion, and retaining means carried by said base for preventing said bed from sliding relative to said base.

5. A boat trailer comprising a base, ground wheel means dependingly supported for rotation from said base, a fork member, said fork member including a vertical bifurcated portion, a vertical shank portion, mounting means for rotatably mounting said shank portion in said base, said mounting means including a sleeve, an aperture in said base, said sleeve extending through said aperture, said shank portion rotatably retained in said sleeve, a bed, said bed slidably supported within said bifurcated portion, and retaining means carried by said base for preventing said bed from sliding relative to said base.

6. A boat trailer comprising a base, ground wheel means dependingly supported for rotation from said base, a fork member, said fork member including a vertical bifurcated portion, a vertical shank portion, mounting means for rotatably mounting said shank portion in said base, said mounting means including a sleeve, an aperture in said base, said sleeve extending through said aperture, said shank portion rotatably retained in said sleeve, aligned apertures in said bifurcated portion, a bolt extending through said apertures and retained therein, a bed, said bed slidably supported within said bifurcated portion closed by said bolt, and retaining means carried by said base for preventing said bed from sliding relative to said base.

7. The combination of claim 6 including a roller mounted on a terminal portion of said bed for facilitating the loading of a boat on the bed.

8. The combination of claim 7 wherein winch means for aiding in loading a boat into said bed is carried by said bed.

9. A boat trailer comprising a base, a forked member, said member including a bifurcated portion and a shank portion, said shank portion rotatably supported by said base for rotation about a vertical axis, a bed supported in said bifurcated portion tiltable with respect thereto about a horizontal axis, said bed including winch means carried thereby, rotatable ground wheel means dependingly supported from said base, and retaining means detachably locking said bed to said base.

10. A boat trailer comprising a longitudinally extending base defining a longitudinal axis and having rotatable ground wheel means depending therefrom, a bed, means mounting said bed on said base for permitting pivotal movement of said bed about a vertical axis and tiltable movement of said bed about a horizontal axis, said longitudinal, vertical and horizontal axes being mutually perpendicular and winch means including a cable adapted to be fastened to a boat supported on one end of said bed, and retaining means detachably locking said bed to said base.

11. A boat trailer comprising a longitudinally extending base defining a longitudinal axis and having rotatable ground wheel means depending therefrom, an elongated bed, means mounting said bed on said base for permitting pivotal movement of said bed about a vertical axis and tiltable movement of said bed about a horizontally disposed axis extending transversely of said bed, said longitudinal, vertical and horizontal axes being mutually perpendicular, and a post member extending perpendicularly from said bed, an idler pulley carried by said post member, winch means fixed to said bed, said winch means including a cable extending over said idler pulley, and retaining means detachably locking said bed to said base.

12. The combination of claim 9 including a roller mounted on a terminal portion of said bed.

References Cited in the file of this patent

UNITED STATES PATENTS

| | | |
|---|---|---|
| 1,589,090 | Bamberger | June 15, 1926 |
| 2,424,692 | Harshberger | July 29, 1947 |
| 2,485,793 | Vassar | Oct. 25, 1949 |
| 2,765,180 | Albers | Oct. 2, 1956 |
| 2,786,590 | Edwards et al. | Mar. 26, 1957 |
| 2,807,381 | Tegeler | Sept. 24, 1957 |
| 2,808,953 | Whitney | Oct. 8, 1957 |
| 2,828,029 | Easley | Mar. 25, 1958 |
| 2,937,776 | Beckham | May 24, 1960 |

FOREIGN PATENTS

| | | |
|---|---|---|
| 559,755 | Great Britain | Mar. 3, 1944 |